US 8,341,323 B2

(12) United States Patent
Park (10) Patent No.: US 8,341,323 B2
(45) Date of Patent: *Dec. 25, 2012

(54) METHOD AND APPARATUS FOR DATA MOVEMENT IN A SYSTEM ON A CHIP

(75) Inventor: Edwin Park, San Diego, CA (US)

(73) Assignee: AirHop Communications, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/302,854

(22) Filed: Nov. 22, 2011

(65) Prior Publication Data

US 2012/0066426 A1  Mar. 15, 2012

Related U.S. Application Data

(63) Continuation of application No. 12/148,940, filed on Apr. 23, 2008, now Pat. No. 8,078,784.

(51) Int. Cl.
*G06F 13/00* (2006.01)

(52) U.S. Cl. ........................................ 710/305; 710/100

(58) Field of Classification Search .................. 710/100, 710/305, 104
See application file for complete search history.

(56) References Cited

U.S. PATENT DOCUMENTS

| | | | | |
|---|---|---|---|---|
| 7,185,128 | B1* | 2/2007 | Kotlowski et al. | 710/104 |
| 8,046,503 | B2* | 10/2011 | Couvert et al. | 710/22 |
| 2005/0180437 | A1* | 8/2005 | Twomey | 370/401 |
| 2006/0123154 | A1* | 6/2006 | George | 710/33 |

\* cited by examiner

*Primary Examiner* — Glenn A Auve
(74) *Attorney, Agent, or Firm* — Larry E. Henneman, Jr.; Henneman & Associates PLC (57) ABSTRACT

There is provided a system for comprising a plurality of blocks, each block comprising any hardware element and a plurality of segments for providing interconnection of the plurality of blocks. A segment comprises a connector between multiple blocks and other segments and segments are connected via the ports of blocks or other segments. Communications between blocks is packet based, each packet including at least a destination block. The packet includes at least one of data, packet/message identification and padding. Blocks have an associated address. A block has one or more input ports and one or more output ports. Segments include means for routing packets to destinations. Each block and segment includes properties. Properties include one or more of clocks, bandwidth, bit widths, and latencies. The plurality of segments for multiple packets to be active on different segments. A single segment includes a plurality of ports for multiple packets to be active on different ports of the segment.

76 Claims, 4 Drawing Sheets

METHOD AND APPARATUS FOR DATA MOVEMENT IN A SYSTEM ON A CHIP

RELATED APPLICATIONS

This application is a continuation of U.S. patent application Ser. No. 12/148,940, filed Apr. 23, 2008 now U.S. Pat. No. 8,078,784 by the same inventor, which is incorporated herein by reference in its entirety.

FIELD OF THE INVENTION

The present invention relates to methods and apparatuses for a system on a chip (SOC) and is particularly concerned with data movement.

BACKGROUND OF THE INVENTION

Current Systems on a Chip (SOC) have grown more complicated than systems in the past. Systems in the future will have even more complexity than those of today. Complexity grows in many directions:
 1) The system attempts to provide more features. In this situation, the number of blocks in the system increases to support the additional features.
 2) The system attempts to do more on current metrics. For example, a camera may have more mega-pixels. Another example would be a turbo decoder that is upgraded to have a larger throughput. In this situation, each block either gets more complex or runs faster.
 3) The system combines multiple legacy systems. For example, a simple phone has become a mobile phone, a camera, and a music player.

As systems become complex, one notices several trends:
 1) There are many blocks that are similar across the system (i.e. multiple Turbo decoders for the different modes). The resulting system has blocks that are similar and exist in several areas of the system. However, due to the architecture, the blocks cannot be reused in the different modes.
 2) Processors run faster and get larger to provide the processing power required. The new processors take a larger gate count. Also, the power requirement for the processor increases. Furthermore, as the processor becomes more complicated, the interface requirements become more complicated. With this, the time/cycle required to communicate outside the processor increases as the interface grows more complex.
 3) Systems become an amalgam of disparate systems. The interfaces between the disparate systems are ad hoc and inefficient.
 4) The power required to run the system increases.
 5) Interfaces between each block become more specialized and cannot be reused even though the functions may be similar.

Figure 1:
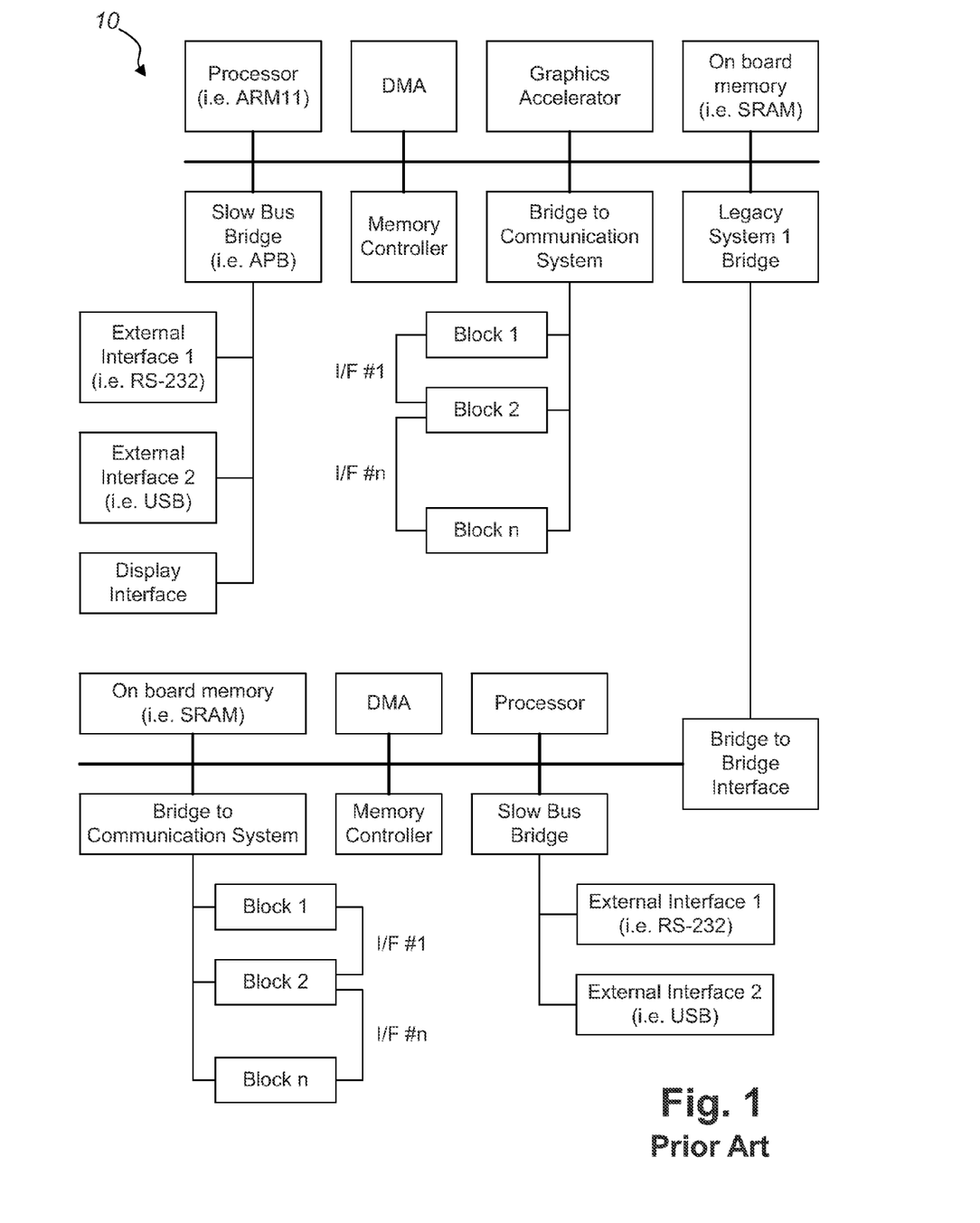
FIG. 1 illustrates in a block diagram a typical System on a Chip design (SOC)

Referring to FIG. 1, there is illustrated in a block diagram a typical System on a Chip design (SOC) 10. SOC typically have:
 1) Processor(s)
 2) Memory
 3) Blocks/Peripherals
 4) Busses In the above, the blocks and processors are connected via the interconnect bus. Also, there are many disparate busses. As the number of blocks increase on a bus, the throughput decreases and/or the latency increases since the loading on the bus increases. Bridges are used to split the busses up so that the blocks that can take a larger latency of lower bandwidth can be "moved further away."

In the example in FIG. 1, the processor, the DMA, the graphics accelerator, the on board memory, memory controller, and the 3 bridges are on the main bus. Typically, this is the fastest bus with the highest bandwidth. However, there are too many blocks in the system to put all on the main bus. Therefore, the three bridges provide the bridging services for the other blocks. There is a slow bus that has 3 blocks to support external interfaces. There is another bus to the communication system to talk to Blocks 1 to Block n. Also, there is a legacy system that is connected through the Legacy System Bridge.

There are many examples of busses. Some of the popular busses are APB, AHB, and OCP. One of the hallmarks of the busses is registers and memories are memory mapped.

Also, blocks/peripherals that need to communicate some information, status, or timing to another block uses an ad hoc scheme to communicate. This ad hoc scheme is typically customized for the specific interface and cannot be used for another interface. In FIG. 1, I/F #1 ad I/F #n are the ad hoc interface connecting the blocks so that the blocks can communicate. Also, the interrupts are not shown in FIG. 1.

Figure 2:
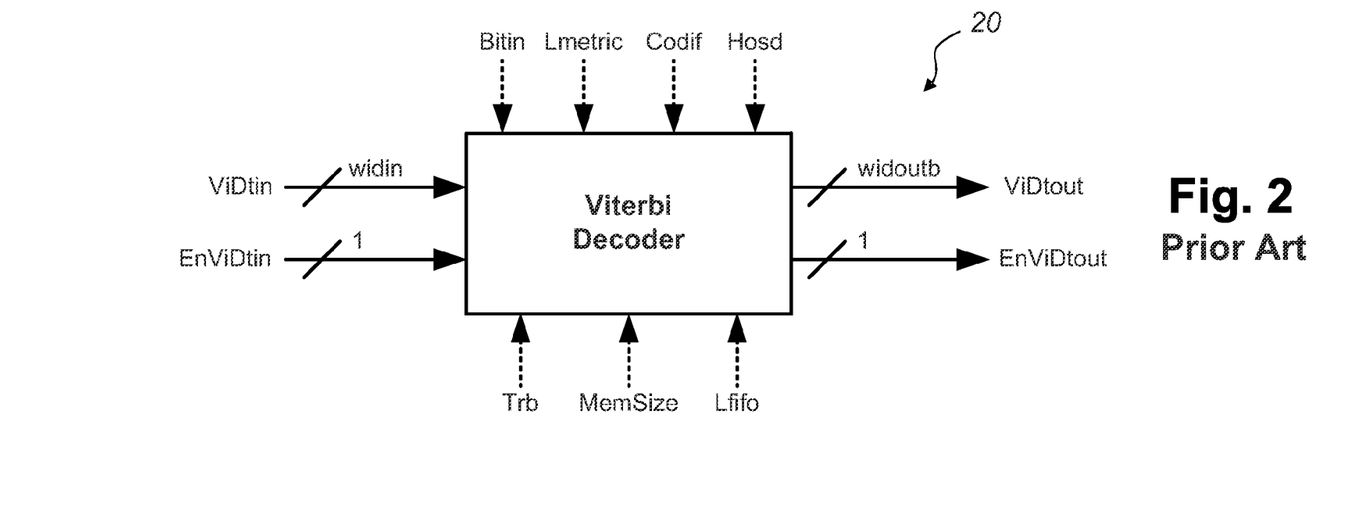
FIG. 2 illustrates an ad hoc interface of a block of FIG. 1.
Figure 3:
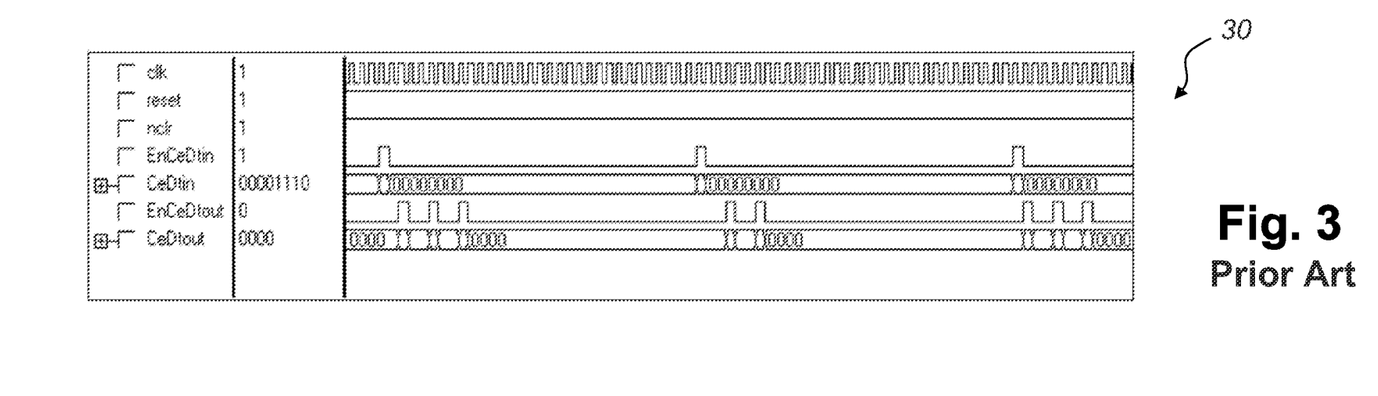
FIG. 3 illustrates in a timing diagram for the ad hoc interface of FIG. 3.

Referring to FIGS. 2 and 3 there is illustrated an example of an ad hoc interface 20 and its timing diagram 30 of a block (for example. Block #n) in FIG. 1. The ad hoc interface for this example is for a viterbi decoder. The ad hoc interface is specialized for a viterbi decoder. This interface would not work for another block.

Blocks that need to communicate to the processor communicate in one of two ways:
 1) The processor polls the blocks continuously.
 2) The block interrupts the processor either directly or indirectly and the processor then goes gets the information.

Furthermore, blocks can directly talk to other blocks. Typically, they share a tightly coupled interface (i.e. another specialized interface). Often, the interface has a tight handshake protocol.

Systems and methods disclosed herein provide a method and apparatus for data movement in a system on a chip to obviate or mitigate at least some of the aforementioned disadvantages.

SUMMARY OF THE INVENTION

An object of the present invention is to provide improved method and apparatus for data movement in a system on a chip.

In accordance with an aspect of the present invention there is provided a method of configuring a system on chip comprising of the step of providing a destination of a message/packet at a predetermined time.

In accordance with another aspect of the present invention there is provided a system for comprising a plurality of blocks, each block comprising any hardware element and a plurality of segments for providing interconnection of the plurality of blocks.

In an embodiment of the present invention there is provided a system for comprising a plurality of systems on chip, each system on chip including a plurality of blocks, each block comprising any hardware element and a plurality of segments for providing interconnection of the plurality of blocks, at least two systems on chip connected via a segment that extends outside boundaries of each of the two systems on chip.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 4:
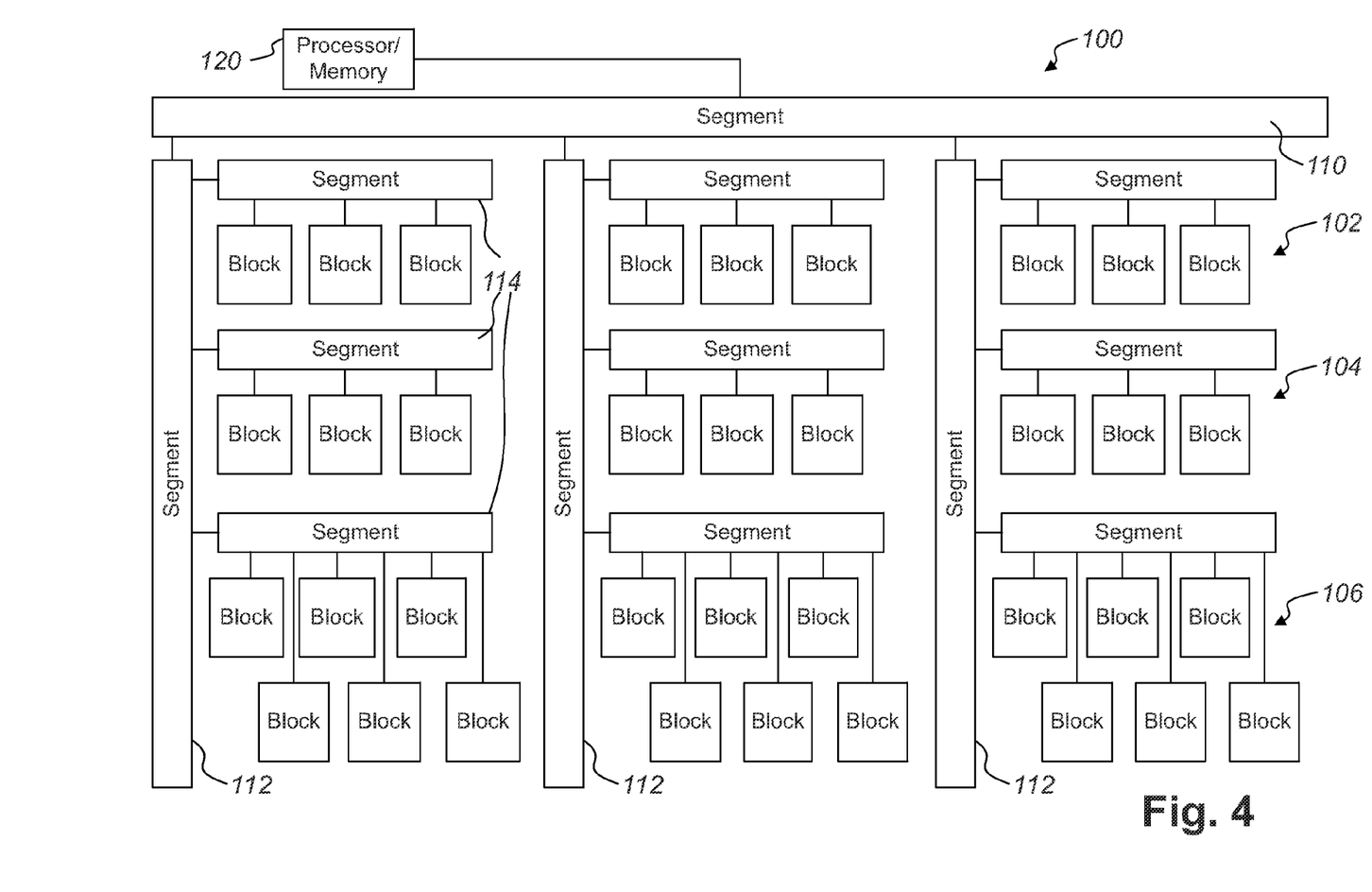
FIG. 4 illustrates a system on chip in accordance with an embodiment of the present invention.

Referring to FIG. 4 there is illustrated a System-on-Chip SOC in accordance with an embodiment of the present invention. The system on chip has different blocks, including processors, that communicate with each other. For example, a system 100 that includes blocks 102, 104, 106 and segments 110, 112, 114 where a block is defined as any hardware element. A block may include one or more processors. A block may be a processor 120, in fact any of the blocks 102, 104 and 106 may be processors. A block has one of more ports. There is no minimum or maximum size of the block. Each block communicates via a unified interface.

The system simplifies the interface of both the processor 120 and the blocks 102, 104, 106 through the unified interface. The concept of the segments that connect the processor(s) and blocks to each other is based upon the unified interface for blocks and the application of a hierarchy of segments to provide for scaleable bandwidth. A processor 120 is treated just as any other blocks. The implementation of the system may, in fact, not include a processor.

Embodiments of the present invention also segment the communication traffic between the blocks and processors (i.e. block-to-block, block-to-processor, processor-to-block, and processor-to-processor).

The segments can scale at different levels of the hierarchy. A segment is the connector between multiple blocks, as shown by segments 114 and other segments as shown by segments 110 and 112. A segment (not shown in FIG. 4) can also join a mix of segments and blocks at the same level of hierarchy. The segments are connected via the ports of the block or other segments. The ports use a common unified interface.

The communication of the blocks is packet based. At a minimum, the packet includes a destination block. The packet may also include data, packet/message identification, padding, etc. Packets are used to carry the message that contains information to be sent from one block to another. A single message may span multiple packets.

The blocks can have one or more associated addresses. For example, providing a block with two separate addresses facilitates the segregation of control and data on two separate ports. In other instances, a block may have multiple ports, but only have 1 address (e.g., when it is desirable to increase the data rate). A block has one or more input ports and one or more output ports. A single port can be both if desired. The number of input and output ports for either block or segment does not have to be the same. A block can also have an input or an output.

In another embodiment, the system on chip has multiple segments where:
  a). A segment is the connector between multiple blocks and/or other segments. The segments are connected via the ports of the blocks and/or other segments.
  b). A segments have the ability to route the packets to the correct destinations.
  c). The routes do not have to be unique.

In another embodiment, the system on a chip includes:
  a). Each of the different blocks and segments having a different (or the same) properties.
  b). Properties include but are not limited to clocks, bandwidth, bit widths, and latencies.
  c). Properties describe block-to-block logical connections do not have to be the same.

In another embodiment, the system on a chip includes
  a). If multiple segments exist, multiple packets can be active on different segments.
  b). On a single segment, multiple packets can be active on different ports of the packet.

In another embodiment, we claim that one realization of the above claim (any or all) where
  a). Multiple messages/packets can exist on block-to-block communications.
  b). Certain block-to-block pairs may or may not communicate though a logical connection can exist.

In another embodiment, the system on a chip includes
  a). The destination of the message/packet is not known to the block until a later time.
  b). The later time include, but not limited to
    i. After fabrication.
    ii After a code update.
    iii. After provisioning.
    iv. After measuring or reading states in the environment.
    v. After a functionality change.

In another embodiment, the system on a chip includes
  a). The data and the address of the block is transmitted on the same interface or
  b). The data and the address of the block is transmitted on a different interface.

In another embodiment, the system includes multiple SOCs wherein each can be connected via a segment that extends outside the boundaries of a SOC.

Figure 5:
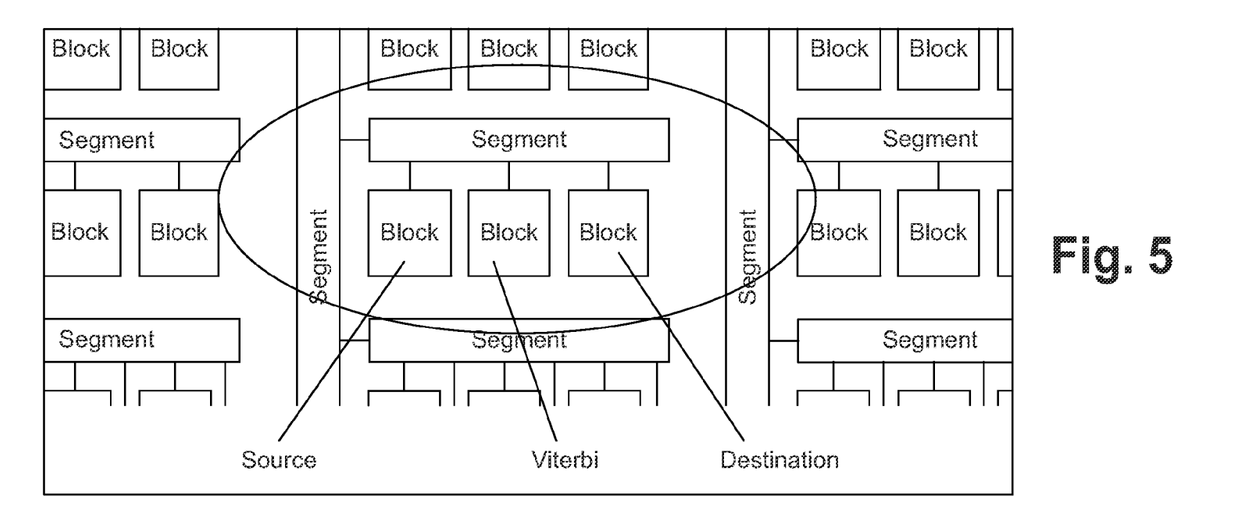
FIG. 5 illustrates how the example of FIG. 2 is implemented in accordance with an embodiment of the present invention.

Referring to FIG. 5, there is illustrated how the example of FIG. 2 is implemented in accordance with an embodiment of the present invention. From the example given in FIG. 2, the following changes are made to the block. The actual computation engine of the viterbi needs no change. In the example, we take a segment where the source of the data for the viterbi is present (i.e. de-interleaver), the viterbi block itself, and the destination of the viterbi's output (i.e. decrypter).

The interface of each of these blocks (including the viterbi) could be identical.

TABLE A

| Block Interface | | |
|---|---|---|
| M_DATA[7:0] Output Data. | OUT | Data |
| M_ENABLE Signals when M_DATA is valid. | OUT | Enable |

TABLE A-continued

| | | |
|---|---|---|
| M_FLUSH | OUT | Flush |

Used to flush interface out. Useful at startup.

| | | |
|---|---|---|
| M_CLK | IN or OUT | Clock |

Clock for the interface. The CLK is an output if the interface is in Source Synchronous Mode. The CLK for the Master and Slave shall be phase and frequency aligned.

| | | |
|---|---|---|
| M_BUSY | IN | Busy |

Signal used by the Slave to indicate that the interface is busy.

| | | |
|---|---|---|
| S_DATA[7:0] | IN | Data |

InputData.

| | | |
|---|---|---|
| S_ENABLE | IN | Enable |

Signals when S_DATA is valid.

| | | |
|---|---|---|
| S_FLUSH | OUT | Flush |

Used to flush interface out.

| | | |
|---|---|---|
| S_CLK | IN | Clock |

Clock. Can be the same net as M_CLK.

| | | |
|---|---|---|
| S_BUSY | OUT | Busy |

Signal used by the Slave to indicate that the interface is busy.

The following step demonstrates the data flow. This is a basic that does not demonstrate the full power of running the blocks in parallel.

a) Through its master interface (M_*), the de-interleaver (e.g. source) sends the block (can be broken up into multiple blocks) to be decoded to the decoder on the decoder's slave interface (S_*).
b) Upon receiving the data, the decoder engine starts and decodes the data.
c) When the decoder is finished, the decoder sends the decoded data on its master interface to the slave interface of the decrypter.

A typical problem occurs when after a first generation of a product is produced, the next generation of product needs more features. For example, the new feature is to run the system with twice the amount of data.

Figure 6:
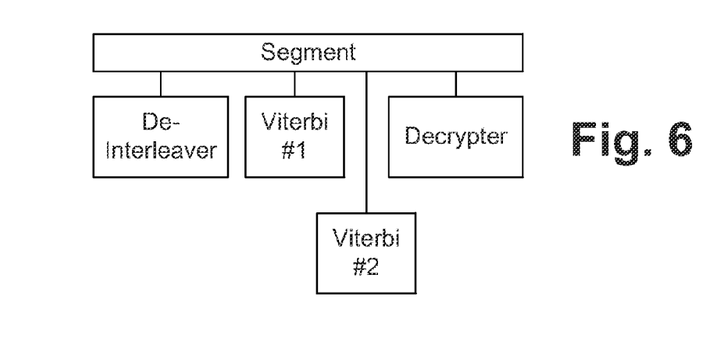
FIG. 6 illustrates how the implementation of FIG. 5 may be updated in accordance with an embodiment of the present invention.

Pre-Data Highway, the entire system would have to be re-architected. However, with the Data Highway, the large problem can be broken down into many smaller problems. In this example, since the de-interleaver and de-crypter are simple enough, they can handle the increase in data rates. However, the decoder cannot. Without a redesign, one can place two decoders and time share the two. Since the interface for the blocks (shown in Table A) is the same, this has minimal (if any effects) on the interleaver or de-crypter, Referring to FIG. 6, there is illustrated how the implementation of FIG. 5 may be updated in accordance with an embodiment of the present invention. The following steps demonstrate the data flow. This is a basic example that does not demonstrate the full power of running the blocks in parallel.

a) Through its master interface (M_*), the de-interleaver (e.g. source) sends the block (can be broken up into multiple blocks) to be decoded to the decoder on the decoder's slave interface (S_*).
b) Upon receiving the data, the decoder engine #1 starts and decodes the data.
c) Meanwhile, the de-interleaver sends its next block to decoder #2. The data is sent via the master interface of the de-interleaver to the slave interface of decoder #2.
d) Upon receiving the data, the decoder engine #2 starts and decodes the data.
e) When the decoder #1 is finished, the decoder sends the decoded data on its master interface to the slave interface of the decrypter.
f) When the decoder #2 is finished, the decoder sends the decoded data on its master interface to the slave interface of the decrypter.

Numerous modifications, variations and adaptations may be made to the particular embodiments described above without departing from the scope patent disclosure, which is defined in the claims.

What is claimed is:

1. A system comprising:
    a first integrated circuitry block associated with a first address;
    a second integrated circuitry block associated with a second address; and
    a first segment coupled to said first integrated circuitry block and to said second integrated circuitry block, said first segment operative to route packets to a plurality of destinations based on destination addresses associated with said packets and to communicate with said first integrated circuitry block and said second integrated circuitry block simultaneously; and wherein
    each of said packets includes a destination address and data, said destination address selected from a plurality of destination addresses including said first address and said second address; and
    said first integrated circuitry block, said second integrated circuitry block, and said first segment are integrated on a chip.

2. A system according to claim 1, wherein:
    packets routed from said first segment to said first integrated circuitry block include said first address as said destination address; and
    packets routed from said first segment to said second integrated circuitry block include said second address as said destination address.

3. A system according to claim 1, wherein said first integrated circuitry block includes at least one input port and at least one output port.

4. A system according to claim 1, wherein said first address and said second address are unique.

5. A system according to claim 1, further comprising:
    a third integrated circuitry block associated with a third address; and
    a second segment coupled to said third integrated circuitry block and said first segment, said second segment operative to route packets to at least some of said plurality of destinations based on at least some of said plurality of destination addresses, said plurality of destination addresses including said third address.

6. A system according to claim 5, wherein said third integrated circuitry block and said second segment are integrated on said chip.

7. A system according to claim 6, further comprising:
    a third segment coupled between said first segment and said second segment, said third segment facilitating intercommunication between said first segment and said second segment by routing packets between said first segment and said second segment based on said destination addresses associated with said packets; and wherein
    said third segment is integrated on said chip.

8. A system according to claim 5, wherein said third integrated circuitry block and said second segment are integrated on a second chip.

9. A system according to claim 8, further comprising:
    a third segment coupled between said first segment and said second segment, said third segment facilitating intercommunication between said first segment and said second segment by routing packets between said first segment and said second segment based on said destination addresses associated with said packets; and wherein said third segment is located off said chip and off said second chip.

10. A system according to claim 1, wherein said segment facilitates the routing of multiple ones of said packets simultaneously.

11. A system according to claim 1, wherein:
said first integrated circuitry block is associated with a plurality of addresses, including said first address; and
said plurality of destination addresses includes at least two of said plurality of addresses associated with said first integrated circuitry block.

12. A system according to claim 11, wherein:
said first integrated circuitry block includes a plurality of ports; and
each of said plurality of ports is associated with a different one of said plurality of addresses associated with said first integrated circuitry block.

13. A system according to claim 1, wherein:
said first integrated circuitry block includes a plurality of ports; and
each of said plurality of ports is associated with said first address.

14. A system according to claim 1, wherein:
a property of said first integrated circuitry block is different than the same said property of at least one of said second integrated circuitry block and said first segment; and
said property is selected from the group comprising clock rate, bandwidth, bit width, and latency.

15. A method for configuring elements integrated on a chip, said method comprising:
assembling packets, each packet including data to be transferred and a destination address selected from a plurality of destination addresses associated with a plurality of destinations;
providing a first integrated circuitry block integrated on said chip;
providing a second integrated circuitry block integrated on said chip;
providing a first segment integrated on said chip and coupled to said first integrated circuitry block and said second integrated circuitry block, said first segment operative to route said packets to at least some of said plurality of destinations based on said plurality of destination addresses; and
assigning a first address to said first integrated circuitry block and a second address to said second integrated circuitry block, said first address and said second address indicating respective destinations for ones of said packets having at least one of said first address and said second address as said destination address; and wherein
said segment is operative to route multiple ones of said packets simultaneously.

16. A method according to claim 15, wherein said first address and said second address are unique.

17. A method according to claim 15, further comprising:
providing a third integrated circuitry block;
providing a second segment in communication with said third integrated circuitry block and said first segment, said second segment operative to route said packets to at least some of said plurality of destinations based on at least some of said plurality of destination addresses; and assigning a third address to said third integrated circuitry block, said third address indicating a destination for ones of said packets having said third address as said destination address.

18. A method according to claim 17, wherein said third integrated circuitry block and said second segment are integrated on said chip.

19. A method according to claim 18, further comprising:
providing a third segment facilitating intercommunication between said first segment and said second segment by routing said packets between said first segment and said second segment; and wherein
said third segment is integrated on said chip.

20. A method according to claim 17, wherein said third integrated circuitry block and said second segment are integrated on a second chip.

21. A method according to claim 20, further comprising:
providing a third segment coupled between said first segment and said second segment, said third segment facilitating intercommunication between said first segment and said second segment by routing packets between said first segment and said second segment; and wherein
said third segment is located off said chip and off said second chip.

22. A method according to claim 15, further comprising assigning a third address to said first segment.

23. A method according to claim 15, wherein:
said step of assigning said first address and said second address occurs at a predetermined time; and
said predetermined time includes a time after one of fabrication, a code update, provisioning, measuring or reading states in the environment, and a functionality change.

24. A system comprising:
a first integrated circuitry block associated with a first address;
a second integrated circuitry block associated with a second address; and
a first segment coupled to said first integrated circuitry block and to said second integrated circuitry block, said first segment operative to route packets to a plurality of destinations based on destination addresses associated with said packets; and wherein
said first segment facilitates the routing of multiple ones of said packets simultaneously;
each of said packets includes a destination address and data, said destination address selected from a plurality of destination addresses including said first address and said second address; and
said first integrated circuitry block, said second integrated circuitry block, and said first segment are integrated on a chip.

25. A system according to claim 24, wherein:
packets routed from said first segment to said first integrated circuitry block include said first address as said destination address; and
packets routed from said first segment to said second integrated circuitry block include said second address as said destination address.

26. A system according to claim 24, wherein said first integrated circuitry block includes at least one input port and at least one output port.

27. A system according to claim 24, wherein said first address and said second address are unique.

28. A system according to claim 24, further comprising:
a third integrated circuitry block associated with a third address; and a second segment coupled to said third integrated circuitry block and said first segment, said second segment operative to route packets to at least some of said plurality of destinations based on at least some of said plurality of destination addresses, said plurality of destination addresses including said third address.

29. A system according to claim 28, wherein said third integrated circuitry block and said second segment are integrated on said chip.

30. A system according to claim 29, further comprising:
a third segment coupled between said first segment and said second segment, said third segment facilitating intercommunication between said first segment and said second segment by routing packets between said first segment and said second segment based on said destination addresses associated with said packets; and wherein
said third segment is integrated on said chip.

31. A system according to claim 28, wherein said third integrated circuitry block and said second segment are integrated on a second chip.

32. A system according to claim 31, further comprising:
a third segment coupled between said first segment and said second segment, said third segment facilitating intercommunication between said first segment and said second segment by routing packets between said first segment and said second segment based on said destination addresses associated with said packets; and wherein
said third segment is located off said chip and off said second chip.

33. A system according to claim 24, wherein:
said first integrated circuitry block is associated with a plurality of addresses, including said first address; and
said plurality of destination addresses includes at least two of said plurality of addresses associated with said first integrated circuitry block.

34. A system according to claim 33, wherein:
said first integrated circuitry block includes a plurality of ports; and
each of said plurality of ports is associated with a different one of said plurality of addresses associated with said first integrated circuitry block.

35. A system according to claim 24, wherein:
said first integrated circuitry block includes a plurality of ports; and
each of said plurality of ports is associated with said first address.

36. A system according to claim 24, wherein:
a property of said first integrated circuitry block is different than the same said property of at least one of said second integrated circuitry block and said first segment; and
said property is selected from the group comprising clock rate, bandwidth, bit width, and latency.

37. A system comprising:
a first integrated circuitry block associated with a plurality of addresses, including a first address;
a second integrated circuitry block associated with a second address; and
a first segment coupled to said first integrated circuitry block and to said second integrated circuitry block, said first segment operative to route packets to a plurality of destinations based on destination addresses associated with said packets; and wherein each of said packets includes a destination address and data, said destination address selected from a plurality of destination addresses including said first address and said second address;
said plurality of destination addresses includes at least two of said plurality of addresses associated with said first integrated circuitry block; and
said first integrated circuitry block, said second integrated circuitry block, and said first segment are integrated on a chip.

38. A system according to claim 37, wherein:
packets routed from said first segment to said first integrated circuitry block include said first address as said destination address; and
packets routed from said first segment to said second integrated circuitry block include said second address as said destination address.

39. A system according to claim 37, wherein said first integrated circuitry block includes at least one input port and at least one output port.

40. A system according to claim 37, wherein said first address and said second address are unique.

41. A system according to claim 37, further comprising:
a third integrated circuitry block associated with a third address; and
a second segment coupled to said third integrated circuitry block and said first segment, said second segment operative to route packets to at least some of said plurality of destinations based on at least some of said plurality of destination addresses, said plurality of destination addresses including said third address.

42. A system according to claim 41, wherein said third integrated circuitry block and said second segment are integrated on said chip.

43. A system according to claim 42, further comprising:
a third segment coupled between said first segment and said second segment, said third segment facilitating intercommunication between said first segment and said second segment by routing packets between said first segment and said second segment based on said destination addresses associated with said packets; and wherein
said third segment is integrated on said chip.

44. A system according to claim 41, wherein said third integrated circuitry block and said second segment are integrated on a second chip.

45. A system according to claim 44, further comprising:
a third segment coupled between said first segment and said second segment, said third segment facilitating intercommunication between said first segment and said second segment by routing packets between said first segment and said second segment based on said destination addresses associated with said packets; and wherein
said third segment is located off said chip and off said second chip.

46. A system according to claim 37, wherein:
said first integrated circuitry block includes a plurality of ports; and
each of said plurality of ports is associated with a different one of said plurality of addresses associated with said first integrated circuitry block.

47. A system according to claim 37, wherein:
said first integrated circuitry block includes a plurality of ports; and
each of said plurality of ports is associated with said first address.

48. A system according to claim 37, wherein:
a property of said first integrated circuitry block is different than the same said property of at least one of said second integrated circuitry block and said first segment; and
said property is selected from the group comprising clock rate, bandwidth, bit width, and latency.

49. A system comprising:
a first integrated circuitry block including a plurality of ports each associated with a first address;
a second integrated circuitry block associated with a second address; and
a first segment coupled to said first integrated circuitry block and to said second integrated circuitry block, said first segment operative to route packets to a plurality of destinations based on destination addresses associated with said packets; and wherein
each of said packets includes a destination address and data, said destination address selected from a plurality of destination addresses including said first address and said second address; and
said first integrated circuitry block, said second integrated circuitry block, and said first segment are integrated on a chip.

50. A system according to claim 49, wherein:
packets routed from said first segment to said first integrated circuitry block include said first address as said destination address; and
packets routed from said first segment to said second integrated circuitry block include said second address as said destination address.

51. A system according to claim 49, wherein said first integrated circuitry block includes at least one input port and at least one output port.

52. A system according to claim 49, wherein said first address and said second address are unique.

53. A system according to claim 49, further comprising:
a third integrated circuitry block associated with a third address; and
a second segment coupled to said third integrated circuitry block and said first segment, said second segment operative to route packets to at least some of said plurality of destinations based on at least some of said plurality of destination addresses, said plurality of destination addresses including said third address.

54. A system according to claim 53, wherein said third integrated circuitry block and said second segment are integrated on said chip.

55. A system according to claim 54, further comprising:
a third segment coupled between said first segment and said second segment, said third segment facilitating intercommunication between said first segment and said second segment by routing packets between said first segment and said second segment based on said destination addresses associated with said packets; and wherein
said third segment is integrated on said chip.

56. A system according to claim 53, wherein said third integrated circuitry block and said second segment are integrated on a second chip.

57. A system according to claim 56, further comprising:
a third segment coupled between said first segment and said second segment, said third segment facilitating intercommunication between said first segment and said second segment by routing packets between said first segment and said second segment based on said destination addresses associated with said packets; and wherein
said third segment is located off said chip and off said second chip.

58. A system according to claim 49, wherein:
a property of said first integrated circuitry block is different than the same said property of at least one of said second integrated circuitry block and said first segment; and
said property is selected from the group comprising clock rate, bandwidth, bit width, and latency.

59. A system comprising:
a first integrated circuitry block associated with a first address;
a second integrated circuitry block associated with a second address; and
a first segment coupled to said first integrated circuitry block and to said second integrated circuitry block, said first segment operative to route packets to a plurality of destinations based on destination addresses associated with said packets; and wherein
each of said packets includes a destination address and data, said destination address selected from a plurality of destination addresses including said first address and said second address;
a property of said first integrated circuitry block is different than the same said property of at least one of said second integrated circuitry block and said first segment;
said property is selected from the group comprising clock rate, bandwidth, bit width, and latency; and
said first integrated circuitry block, said second integrated circuitry block, and said first segment are integrated on a chip.

60. A system according to claim 59, wherein:
packets routed from said first segment to said first integrated circuitry block include said first address as said destination address; and
packets routed from said first segment to said second integrated circuitry block include said second address as said destination address.

61. A system according to claim 59, wherein said first integrated circuitry block includes at least one input port and at least one output port.

62. A system according to claim 59, wherein said first address and said second address are unique.

63. A system according to claim 59, further comprising:
a third integrated circuitry block associated with a third address; and
a second segment coupled to said third integrated circuitry block and said first segment, said second segment operative to route packets to at least some of said plurality of destinations based on at least some of said plurality of destination addresses, said plurality of destination addresses including said third address.

64. A system according to claim 63, wherein said third integrated circuitry block and said second segment are integrated on said chip.

65. A system according to claim 64, further comprising:
a third segment coupled between said first segment and said second segment, said third segment facilitating intercommunication between said first segment and said second segment by routing packets between said first segment and said second segment based on said destination addresses associated with said packets; and wherein
said third segment is integrated on said chip.

66. A system according to claim 63, wherein said third integrated circuitry block and said second segment are integrated on a second chip.

67. A system according to claim 66, further comprising:
a third segment coupled between said first segment and said second segment, said third segment facilitating intercommunication between said first segment and said second segment by routing packets between said first segment and said second segment based on said destination addresses associated with said packets; and wherein said third segment is located off said chip and off said second chip.

68. A system according to claim 59, wherein:
said first integrated circuitry block includes a plurality of ports;
said first integrated circuitry block is associated with a plurality of addresses, including said first address;
said plurality of destination addresses includes at least two of said plurality of addresses associated with said first integrated circuitry block; and
each of said plurality of ports is associated with a different one of said plurality of addresses associated with said first integrated circuitry block.

69. A method for configuring elements integrated on a chip, said method comprising:
assembling packets, each packet including data to be transferred and a destination address selected from a plurality of destination addresses associated with a plurality of destinations;
providing a first integrated circuitry block integrated on said chip;
providing a second integrated circuitry block integrated on said chip;
providing a first segment integrated on said chip and coupled to said first integrated circuitry block and said second integrated circuitry block, said first segment operative to route said packets to at least some of said plurality of destinations based on said plurality of destination addresses;
assigning a first address to said first integrated circuitry block and a second address to said second integrated circuitry block, said first address and said second address indicating respective destinations for ones of said packets having at least one of said first address and said second address as said destination address; and
assigning a third address to said first segment.

70. A method according to claim 69, wherein said first address and said second address are unique.

71. A method according to claim 69, further comprising:
providing a third integrated circuitry block;
providing a second segment in communication with said third integrated circuitry block and said first segment, said second segment operative to route said packets to at least some of said plurality of destinations based on at least some of said plurality of destination addresses; and
assigning a fourth address to said third integrated circuitry block, said fourth address indicating a destination for ones of said packets having said fourth address as said destination address.

72. A method according to claim 71, wherein said third integrated circuitry block and said second segment are integrated on said chip.

73. A method according to claim 72, further comprising:
providing a third segment facilitating intercommunication between said first segment and said second segment by routing said packets between said first segment and said second segment; and wherein
said third segment is integrated on said chip.

74. A method according to claim 71, wherein said third integrated circuitry block and said second segment are integrated on a second chip.

75. A method according to claim 74, further comprising:
providing a third segment coupled between said first segment and said second segment, said third segment facilitating intercommunication between said first segment and said second segment by routing packets between said first segment and said second segment; and wherein
said third segment is located off said chip and off said second chip.

76. A method according to claim 69, wherein:
said step of assigning said first address and said second address occurs at a predetermined time; and
said predetermined time includes a time after one of fabrication, a code update, provisioning, measuring or reading states in the environment, and a functionality change.

* * * * *